ers.

United States Patent
Cseri et al.

[15] 3,655,400
[45] Apr. 11, 1972

[54] PRODUCTION OF SHELF STABLE REHYDRATABLE RICE

[72] Inventors: Joseph Cseri, Tarrytown; Joseph John Halik, Ossining; Milton Kaplow, White Plains, all of N.Y.

[73] Assignee: General Foods Corporation, White Plains, N.Y.

[22] Filed: July 17, 1969

[21] Appl. No.: 842,691

[52] U.S. Cl. ............................................................99/80 PS
[51] Int. Cl. ..............................................................A23l 1/10
[58] Field of Search ...........................................99/80 PS, 85

[56] References Cited

UNITED STATES PATENTS

| | | | |
|---|---|---|---|
| 2,438,939 | 4/1948 | Ozai-Durrani | 99/80 PS |
| 2,903,360 | 9/1959 | Seltzer | 99/80 PS |

*Primary Examiner*—Raymond N. Jones
*Attorney*—Thomas V. Sullivan, Bruno P. Struzzi and Jerome J. Norris

[57] ABSTRACT

Production of shelf stable dehydrated rehydratable rice having greater than usual moisture contents by cooking rice in a solution comprising polyhydric alcohols salts, and an antimycotic agent.

6 Claims, No Drawings

PRODUCTION OF SHELF STABLE REHYDRATABLE RICE

BACKGROUND OF THE INVENTION

This invention relates to a new and improved process for cooking rice. More particularly, the invention is concerned with a new and improved process for heat treatment of rice under conditions which convert the product into an edible form while collaterally stabilizing said product against microorganic decomposition.

Food products such as rice have heretofore been cooked, primarily in an excess of water, whereupon the food undergoes an enzymatic inactivation, and upon further heat treatment the product is softened or otherwise further altered physically or chemically; such alteration, in the case of starch containing foods is commonly termed gelatinization. Significantly, such cooking processes do not promote any material changes in the microorganic stability of the foodstuff per se, and storage and packaging other than by commercial sterilization (canning) techniques cannot be utilized. However, in the case of vegetables, commercial canning procedures may require prolonged heating to kill spores of anaerobic bacteria and such prolonged heating can produce undesirable loss of flavor and/or texture.

The primary object of the invention is to treat raw rice under conditions which produce partially dried intermediate moisture rice having a moisture content higher than quick-cooking rice, and capable of rehydrating to a texture close to that of cooked raw rice.

A further object of the invention is to treat raw rice under conditions which lend a more moist eating quality thereto, and yet essentially produces a product stable against microorganic decomposition, such that the need for any further treatment to provide bacteriostasis and protection against development of yeasts and/or molds is avoided.

A yet further object of the invention is to produce a partially dried intermediate moisture rice which is capable of rehydration upon soaking in excess hot water for 5 minutes; after which the excess water is poured off.

In general, the quick-cooking dehydrated rehydratable rice products presently on the market will contain about 8 to 14 percent moisture, however, these products tend to be too dry and friable, and are replete with fissures. Moreover, upon rehydration, these products lack the distinct graininess and texture of conventionally cooked rice.

Briefly stated, the present invention eliminates the disadvantages attendant to quick-cooking rice products in current use, by preparing a shelf stable dehydrated rehydratable intermediate moisture rice. The concept of intermediate moisture food products is set forth in U.S. Pat. No. 3,202,514; these products usually have a moisture content in excess of 10 percent and substantially below 75 percent. In general, any significant elevation of the moisture level of many foods above 10 percent will increase their patatability, however, such an increase tends to lead to microbiological decomposition unless the food products are packaged in a hermetically sealed container and commercially sterilized or maintained in a frozen or refrigerated state throughout the period of distribution and storage by the consumer.

One method of preventing microbiological decomposition in foods having moisture in excess of 10 percent is by utilizing the principle of limiting the amount of unbound water capable of supporting microbiological spoilage. This principle is disclosed in U.S. Pat. No. 3,202,514 and is known as the Aw, or the ability of the soluble solids in the food to limit the amount of "free" water available to bacteria; the bacteria's inability to survive this condition; and the subsequent shelf stability or product stability obtained by virtue of this condition.

Since shelf or product stability is the result of having substantially totally inhibited harmful mold as well as bacteriological growth, it has been necessary to incorporate antimycotics such as potassium sorbate in intermediate moisture foods to prevent mold development and ultimate shelf instability.

SUMMARY OF THE INVENTION

It has been found that shelf stable dehydrated rehydratable partially dried free-flowing intermediate moisture rice, containing about 25 percent moisture, may be prepared by washing white raw common rice to remove excess surface starch; draining the excess water therefrom, and cooking the washed rice by immersing said rice in an excess boiling infusion solution comprising a polyhydric alcohol and an antimycotic.

Subsequent to said cooking step, the solution is drained and the rice is dried to a high moisture (about 25 percent) shelf stable form which is resistant to bacteriological and mold growth. The relative concentration of polyhydric alcohol utilized in the boiling infusion solution employed in accordance with the invention will generally range upwards from around 3 percent thereby enabling the amount of polyhydric alcohol in the final intermediate moisture rice to be about 7 percent. In addition to polyhydric alcohols, the boiling infusion solution will contain an equivalent quantity of other stabilizing solutes such as salts. Generally, the boiling infusion solution will contain glycerol as the preferred polyhydric alcohol, and treatment of the washed raw common rice in the infusion solution will be for a period of time sufficient to thermally deactivate any latent enzymatic and pathogenic activity. The stabilizing infusion solution of the invention is employed in an excess amount to immersion cook the rice and cause it to undergo a water substitution by the stabilizing solution, such that the polyhydric alcohols and salt will replace a part of the percent by weight of the moisture which would normally be absorbed in the cooked raw rice. The relative concentration of the polyhydric alcohols and salt used in accordance with the invention will largely be determined by the flavor requirement for the rice or food being so treated. Thus, if the percent of polyhydric alcohols in the shelf stable dehydrated rehydratable rice product is too high, a sweet taste will reside after the rehydration step of hot soaking and pouring off the excess water. Similarly, taste and flavor considerations will also govern the upper feasible limits of salt permissible in the final rice product.

The infusion process of the invention essentially results in dehydration, wherein moisture which would normally be absorbed into the food is partially substituted for by polyhydric alcohol and salt solutes in sufficient concentration to substantially increase the osmotic pressure of the resulting solution infused into the final rice product.

Treatment by the stabilizing infusing solution will preferably involve initial "cook" wherein such solution will be elevated in temperature above 160° F. and the washed rice immersed therein for at least 5 minutes and preferably for a more prolonged period from about 15 to 19 minutes, until the degree of cooking or heat treatment produce the required softening or microorganic inactivation.

The rate of infusion will be determined by the concentration of polyhydric alcohols and salt solutes in a stabilizing solution, the higher the concentrations of the solutes the greater the rate of infusion thereof, and accordingly the less the period required to effect substitution of water in the rice product by polyhydric alcohols and salt.

The process will find its broadest application with the treatment of washed raw rice and contemplates treating said rice to enable packaging aerobically, i.e., packing under less than commercial sterilization conditions.

The expression "polyhydric alcohol" refers to alcohols with two or more hydroxyl groups, most typically such alcohols as glycerol, propylene glycol, sorbitol, mannitol, and mixtures thereof. However, the expression "contemplated in this invention" will also include a variety of sugar alcohols which may be classed by the number of hydroxyl groups and the general formula HOCH (CHOH) nCHCH, where $n$ has values from 2 to 5 like tetritols, penitols, hexitols, heptitols, etc., as well as stereoisomers thereof. In general these polyols are water-soluble, crystalline compounds with small optical rotations in water and have a slightly sweet to a very sweet taste. The polyhydric alcohols should be of a low molecular weight so as to offer a substantial effect in increasing the osmotic pressure of the stabilizing solution contained in the intermediate moisture rice product.

It is a feature of the present invention that the cooking step utilizing the stabilizing infusion solution is conducted in an excess of said solution, whereupon the weight level of solution to unwashed rice will range from 2:1 to 10:1 and above; the stabilizing solution constituting a major percent by weight of water, and minor remaining percentages of polyhydric alcohols, salt, and an antimycotic. The principal objective as to effect dilution of the moisture which would be absorbed into the rice product during cooking, through partial substitution therefor by polyhydric alcohols and salt in a period of time commensurate with that degree of heat treatment or cooking required to produce the chemical and physical changes attendant to conventionally cooked rice, and yet, following air drying preparatory to rehydration for eventual eating, the dehydrated shelf stable rice product will be higher in moisture content than quick-cooking rices and will lack the dry friable qualities and fissured appearances of these rices.

Polyhydric alcohols used will be employed at a level in solution so that, after completion of the infusion treatment and drying step, the dehydrated rehydratable intermediate moisture rice product will have about 7 percent polyhydric alcohol; which to an extent is established by the level of salt solute in the cooking solution. As the level of salt in the cooking solution increases, the level of polyhydric alcohol that might otherwise be employed therein, will be reduced.

It has been found that in order to obtain a shelf stable dehydrated rehydratable rice product of 25 to 30 percent moisture, which will not be too sweet or salty upon rehydration, the amounts of polyhydric alcohol and salt contained in the stabilizing cook solution must be such as to give rise to a rehydratable rice product having about 7 percent polyhydric alcohol and 5 percent salt solubles. The corresponding cook solution necessary for production of proper tasting shelf stable rehydratable rice will usually contain little more than 3 percent each of polyhydric alcohol and salt.

The preferred way to treat the rice intended for the cook infusion is to remove excess surface starch by washing the rice for 5 minutes in water, draining said washed rice, and then subjecting the washed product to excess stabilizing cook solution above 160° F. for a time ranging between 14 to 20 minutes, so that any latent enzyme activity or microorganic instability precursors will be inactivated. Since the level of additives in the infusion solution is low, adequate hydration of the starch in the rice is achieved as a result of this one-step infusion process. After cooking and draining, the rice product is dried by air at 300° F. for about 10 to 11 minutes to provide a product having water activity ranging from 0.82 to 0.88. Upon equilibrating for approximately a day, the product became free-flowing after slight agitation.

Rice products stabilized by the present invention will generally be of at least two types. The first type will be products intended for consumption after rehydrating in hot water to enhance the acceptability of the product in terms of flavor and texture. The second type of rice products are those which are intended to be mixed with other foods, such as stabilized meat cuts or vegetables and further hydrated to form soups and other fluid preparations.

Preferred salts which may be used in the invention will be readily ionizable low molecular weight compounds which increase the osmotic pressure of the stabilizing infusion solution, such that the solution has a significant increase in ability to provide bacteriostasis and microorganic stability. Typical salts of use in accordance with the invention are: Sodium chloride, calcium chloride, sodium phosphate, trisodium citrate and like inorganic and organic acid salts commonly used in foodstuffs, and mixtures thereof. Other salts of higher molecular weight which are less readily ionizable may be employed, however, with generally lesser effect in so far as bacteriostasis and microorganic stability are concerned.

The following examples will more specifically set forth the preferred embodiment of the invention:

EXAMPLE 1

Two hundred parts of white rice is washed in excess water at ambient temperatures for about 5 minutes to remove the excess surface starch. The water containing the excess surface starch is drained off and the washed raw rice is immersed in 2,000 parts of boiling infusion solution and boiled at about 212° F. for about 15 to 20 minutes. Next, the infusion solution is drained off and the rice is then dried by passing heated air at temperatures ranging from 110° to 300° F. over said rice for about 10 to 15 minutes to obtain a partially dried shelf stable intermediate moisture rice product having a moisture content ranging from about 17 to 35 percent and water activity ranging from 0.71 to 0.88. Upon equilibrating for approximately 1 day, the product became free-flowing with slight agitation.

| Ingredients | Solution(%) | Final Product(%) |
|---|---|---|
| Rice Solids | — | 62.7 |
| Water | 91.50 | 25.0* |
| Salt | 3.44 | 5.0 |
| Glycerol | 3.44 | 5.0 |
| Propylene Glycol | 1.42 | 2.0 |
| Potassium Sorbate | 0.20 | 0.3 |
| Totals: | 100.00 | 100.0 |

*Actual % moistures varied from 17 to 35%, water activities ranged from 0.71 to 0.88 indicating microbiological stability at room condition storage without aseptic packaging.

Bacteriological results conducted on two samples with different moisture contents and Aw's after storage of 6 weeks at room temperature are shown below:

| Sample | %H$_2$O | Aw | SPC* | Molds | Yeast |
|---|---|---|---|---|---|
| 1 | 29.8 | 0.85 | 20 | <10 | <10 |
| 2 | 34.6 | 0.88 | <10 | 10 | <10 |

*Standard Plate Count

These results indicate that products up to an Aw of 0.88 are still microbiologically stable.

The shelf stable rehydratable dehydrated rice was rehydrated by soaking in excess water at temperatures in excess of 160° F. for at least 5 minutes and the excess water was poured-off to provide a good tasting rice having an appearance much like that of conventionally cooked rice.

Calculations for determining the composition of the cook-infusion solution were as follows:

Taking the target formula, the Aw lowering for each ingredient was calculated and totalled, then subtracted from 1.0 to give the target Aw.

Target Formulas

| Ingredient | Final Product(%) | Aw Lowering | Before Drying(%) |
|---|---|---|---|
| Rice Solids | 62.7 | — | 30.00 |
| Water | 25.0 | — | 11.90 |
| Salt | 5.0 | 0.110 | 2.40 |
| Glycerol | 5.0 | 0.035 | 2.40 |
| Propylene Glycol | 2.0 | 0.015 | 1.00 |
| Potassium Sorbate | 0.3 | 0.003 | 0.14 |
| Totals: | 100.0 | 0.163 | 47.84 |
| Water to be removed | | | 52.16 |
| | | | 100.00 |

Calculated Target Aw: 0.837

The Aw lowering effect of each ingredient was calculated from the basic formula:

$$Aw \text{ lowering} = 1.0 - \frac{n_1}{n_1 + v \times n_2}$$

Where $n_1$ is the moles of water, $n_2$ is the moles of solute and $v$ is the number of ions generated from the solute.

The percentage of each ingredient in the "Before Drying" target formula was calculated by multiplying the percentage of the ingredient desired in the final product by the ratio of rice solids before and after drying. Thus, the percentage of salt was determined as $30.0/62.7 \times 5.0 = 2.4$ The composition of the infusion solution was determined by taking the target formula of the infused rice before drying and dividing each ingredient by 70 percent. The 70 percent figure is determined by subtracting the 30 percent rice solids from 100.

While a specific formulation and procedure have been given for the preparation of partially dried intermediate moisture rice, it can be seen that variations in formulas and procedures as well as starting materials are possible. For example, the cooking time will vary with the type of rice used. Optimum cooking time will be that which thoroughly cooks the particular rice without overcooking.

The concentrations of the ingredients in the infusion solution will depend mainly on the final moisture in the product and also to some extent on the final Aw desired as well as the level of antimycotics.

It has been found that rapid bacteriological spoilage will take place at Aw's above 0.90. Below that level, growth is generally inhibited, but there may be occasional organisms that will grow at Aw's below 0.90. Whether there are such organisms in rice and whether they will grow in rice would have to be determined. In general, Aw's in the range of 0.80 to 0.85 are safe based on the tests conducted.

Another important factor for microbiological stability, especially mold and yeast inhibition, is the type and amounts of antimycotics used in the rice. The formula given uses 2.0 percent propylene glycol and 0.3 percent potassium sorbate as the antimycotic system. These levels have been found to be effective in the intermediate moisture rice products. However, lower levels would also be effective.

What is claimed is:

1. A process for producing shelf stable rehydratable rice having a polyhydric alcohol content of about 7 percent, comprising immersion cooking said rice in excess stabilizing solution for a period sufficient to thermally inactivate the enzymatic and pathogenic activity, removing excess stabilizing solution, and partially drying said rice to a moisture content between about 17 to 35 percent; said stabilizing solution containing from about 3 to about 7 percent of polyhydric alcohol, salt, and sufficient antimycotic to prevent mold growth.

2. The process of claim 1 wherein the rice is immersion cooked in the solution at a temperature in excess of 160° F. for a period in excess of 10 minutes.

3. The process of claim 1 wherein the salt solutes present in the solution are selected from the class of readily ionizable salts.

4. The process of claim 1 wherein the rice treated is washed raw rice.

5. The process of claim 1, wherein said cooked rice is air dried at temperatures of at least 110° F. for at least 10 minutes.

6. The shelf stable rehydratable rice produced by the process of claim 1.

* * * * *